T866022

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED SEPTEMBER 16, 1969

866 O.G. 703

825,420

SILVER HALIDE EMULSIONS CONTAINING METAL CHELATE FOG INHIBITORS

Dorothy J. Beavers, % Kodak Park Division, Rochester, N.Y. 14650

Filed May 16, 1969. Published Sept. 16, 1969
Int. Cl. G03c *1/34*
U.S. Cl. 96—110
No Drawing. 13 Pages Specification

Photographic silver halide emulsions and photographic elements comprising said emulsions are improved against the detrimental effects of chemical and environmental fog by incorporating in said emulsions known metal chelates in effective concentrations. Said chelating metals include transition metals, actinides, lanthanides, beryllium, magnesium and the like. Enols of dehydroacetic acid, pyrithione and 1,3 diketone are preferred. Said chelated metals prepared by reacting a suitable salt of said metals with the desired chelating agents.

Silver halide emulsions and elements described can be chemically sensitized, e.g., with noble metal sensitizers alone or in combination with sulfur or selenium sensitizers. They can contain spectral sensitizers, incorporated color-forming couplers, incorporated developing agents, other antifoggants, hardeners, plasticizers, coating aids, vinyl polymers, and other suitable photographic addenda such as described in U.S. Patent 3,297,446 of Dunn issued Jan. 10, 1967 (columns 4–9).